United States Patent
Aramaki

(10) Patent No.: US 7,161,958 B2
(45) Date of Patent: Jan. 9, 2007

(54) RADIO COMMUNICATION SYSTEM AND MULTICAST COMMUNICATION METHOD

(75) Inventor: Takashi Aramaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 910 days.

(21) Appl. No.: 10/069,004

(22) PCT Filed: Jun. 25, 2001

(86) PCT No.: PCT/JP01/05393

§ 371 (c)(1),
(2), (4) Date: Feb. 20, 2002

(87) PCT Pub. No.: WO01/99356

PCT Pub. Date: Dec. 27, 2001

(65) Prior Publication Data

US 2002/0114351 A1     Aug. 22, 2002

(30) Foreign Application Priority Data

Jun. 23, 2000   (JP) ............................. 2000-189592

(51) Int. Cl.
*H04J 3/22* (2006.01)

(52) U.S. Cl. ...................... 370/470; 370/473; 370/535; 370/466; 370/474

(58) Field of Classification Search ................ 370/349, 370/470, 471, 464–468, 350, 329, 338, 401, 370/473–474, 310.1, 310.2, 535–544; 709/249; 455/466

See application file for complete search history.

(56) References Cited

U.S. PATENT DOCUMENTS 5,889,777 A * 3/1999 Miyao et al. .......... 370/395.52
6,246,696 B1 * 6/2001 Yamaguchi et al. ........ 370/475
6,477,149 B1 * 11/2002 Okanoue ..................... 370/312
6,484,209 B1 * 11/2002 Momirov .................... 709/238
6,563,830 B1 * 5/2003 Gershon et al. ....... 370/395.53
6,567,416 B1 * 5/2003 Chuah ........................ 370/418
6,577,609 B1 * 6/2003 Sharony ..................... 370/312

(Continued)

FOREIGN PATENT DOCUMENTS

JP           63092140        4/1988

(Continued)

OTHER PUBLICATIONS

International Search Report dated Sep. 25, 2001.

*Primary Examiner*—Ricky Q. Ngo
*Assistant Examiner*—Nguyen Ngo
(74) *Attorney, Agent, or Firm*—Stevens, Davis, Miller & Mosher, LLP

(57) ABSTRACT

In a base station apparatus 102, when an IGMP control message is contained in a variable-length packet in which is indicated the destination for performing communication in one-to-one or one-to-multiple mode with mobile station apparatuses 106-1 through 106-3, the IGMP control message is mapped onto a fixed-length short packet that is shorter than a fixed-length packet used in communication with mobile station apparatuses 106-1 through 106-3, and also, a variable-length packet is mapped onto a fixed-length packet and a frame signal is composed from this fixed-length packet and the short packet, and is transmitted. In mobile station apparatuses 106-1 through 106-3, the frame signal is decomposed and the variable-length packet and short packet are extracted, the IGMP control message is extracted from the short packet and mapped onto another variable-length packet, and both variable-length packets are multiplexed.

13 Claims, 6 Drawing Sheets

U.S. PATENT DOCUMENTS

| | | | |
|---|---|---|---|
| 6,628,629 B1 * | 9/2003 | Jorgensen | 370/322 |
| 6,683,866 B1 * | 1/2004 | Stanwood et al. | 370/350 |
| 6,771,660 B1 * | 8/2004 | Bourlas et al. | 370/466 |
| 6,785,252 B1 * | 8/2004 | Zimmerman et al. | 370/337 |
| 6,956,834 B1 * | 10/2005 | Stanwood et al. | 370/329 |
| 7,012,931 B1 * | 3/2006 | Higuchi et al. | 370/467 |
| 2002/0012352 A1 * | 1/2002 | Hansson et al. | 370/401 |
| 2002/0099854 A1 * | 7/2002 | Jorgensen | 709/249 |
| 2004/0213197 A1 * | 10/2004 | Zimmerman et al. | 370/346 |

FOREIGN PATENT DOCUMENTS

| | | |
|---|---|---|
| JP | 2000022707 | 1/2000 |
| JP | 2000032007 | 1/2000 |
| WO | 9716006 | 5/1997 |

* cited by examiner

RADIO COMMUNICATION SYSTEM AND MULTICAST COMMUNICATION METHOD

TECHNICAL FIELD

The present invention relates to a radio communication system and multicast communication method that perform multicast communication (one-to-multiple communication) using an IP (Internet Protocol) between a base station apparatus and a plurality of mobile station apparatuses such as mobile phones in a digital mobile communication system, for example, and more particularly to a radio communication system and multicast method that perform multicast communication using an IGMP (Internet Group Multicast Protocol).

BACKGROUND ART

A radio communication system and multicast communication method of this kind have previously been described in Unexamined Japanese Patent Publication No. 2000-32007.

FIG. 1 is a block diagram showing the configuration of a conventional mobile communication system.

In FIG. 1, a router (IGMP compatible router) 3 is connected to a base station apparatus 2, and an IGMP compatible network 4 is connected to the router 3. A plurality of mobile station apparatuses 6-1 through 6-3 are arranged so as to be connected arbitrarily to terminal apparatuses, such as communication terminal apparatuses, 7-1 through 7-3 provided with computer functions.

As shown in FIG. 2, the base station apparatus 2 comprises a radio transmitting/receiving section 11, modulator/demodulator 12, frame composition section 13, and network interface section 15.

As shown by the representative case of mobile station apparatus 6-1 in FIG. 3, each of mobile station apparatuses 6-1 through 6-3 comprises a radio transmitting/receiving section 21, modulator/demodulator 22, frame composition section 23, and terminal interface section 25.

With this kind of configuration, when an IGMP inquiry message arrives at the router 3 from the IGMP compatible network 4, the router 3 transfers an IP packet containing the IGMP inquiry message to subordinate base station apparatus 2.

In the base station apparatus 2, when an IP packet is received by the network interface section 15, a frame signal is composed by the frame composition section 13 by mapping that IP packet onto an L-PDU, which is a fixed-length packet on the user data channel (UDCH).

That frame signal is then transmitted to all mobile station apparatuses using an IGMP inquiry dedicated connection (DUC-ID#1), which is a connection to all mobile station apparatuses 6-1 through 6-3.

That is to say, after being modulated by the modulator/demodulator 12, the configured frame signal undergoes various kinds of transmission processing such as D/A (Digital/Analog) conversion, up-conversion, and amplification (gain control) in the radio transmitting/receiving section 11, and is transmitted as a radio signal from the antenna.

This transmit signal is received by the antenna in each of mobile station apparatuses 6-1 through 6-3, and is output to the radio transmitting/receiving section 21. In the radio transmitting/receiving section 21, the received signal undergoes various kinds of reception processing such as amplification (gain control), down-conversion, and A/D (Analog/Digital) conversion.

After undergoing this processing, the signal is demodulated by the modulator/demodulator 22 and then undergoes frame decomposition by the frame composition section 23. By this means, an IP packet is extracted. This IP packet is output via the terminal interface section 25 to terminal apparatuses 7-1 through 7-3.

When mobile station apparatuses 6-1 through 6-3 receive an IGMP inquiry message contained in an IP packet, a frame signal is composed by mapping an IP packet containing an IGMP report message indicating the multicast IP address for which reception is desired onto an L-PDU fixed-length packet on the UDCH. This frame signal is transmitted to the base station apparatus 2 using an IGMP report dedicated connection (DUC-ID#1), which is a base station connection.

On receiving an IGMP report message, the base station apparatus 2 transmits an IP packet containing the IGMP report message to the router 3 and mobile station apparatuses 6-1 through 6-3.

However, with a conventional apparatus, there is a problem in that, in order to map an IP packet containing an IGMP report message onto an L-PDU, which is a fixed-length packet on the UDCH, there is a need for a dedicated UDCH transmission connection used by all mobile station apparatuses 6-1 through 6-3, separate from the normally used UDCH.

In order to solve this problem, there is a method whereby a connection for IGMP reports is shared by mobile station apparatuses 6-1 through 6-3 by performing random access instead of using a dedicated UDCH. However, with this method also, IP packets containing an IGMP inquiry message or IGMP report message are transmitted and received, and therefore information other than that actually required is transmitted and received. There are consequently problems of redundant information, large overhead, and wasteful use of frequency bands.

DISCLOSURE OF INVENTION

It is an object of the present invention to provide a radio communication system and multicast communication system that enable radio communication resources to be used efficiently when multicast communication is carried out using an IGMP.

This object is achieved by means of a radio apparatus that determines whether or not control procedure information for controlling packet communication is contained in a variable-length packet by which a destination for performing communication in a one-to-one or one-to-multiple mode with other radio apparatuses is indicated, and if the result of this determination is that this control procedure information is contained in such a packet, maps that control procedure information onto a fixed-length short packet that is shorter than a fixed-length packet used in communication with other radio apparatuses.

BEST MODE FOR CARRYING OUT THE INVENTION

With reference now to the accompanying drawings, an embodiment of the present invention will be explained in detail below.

Figure 1:
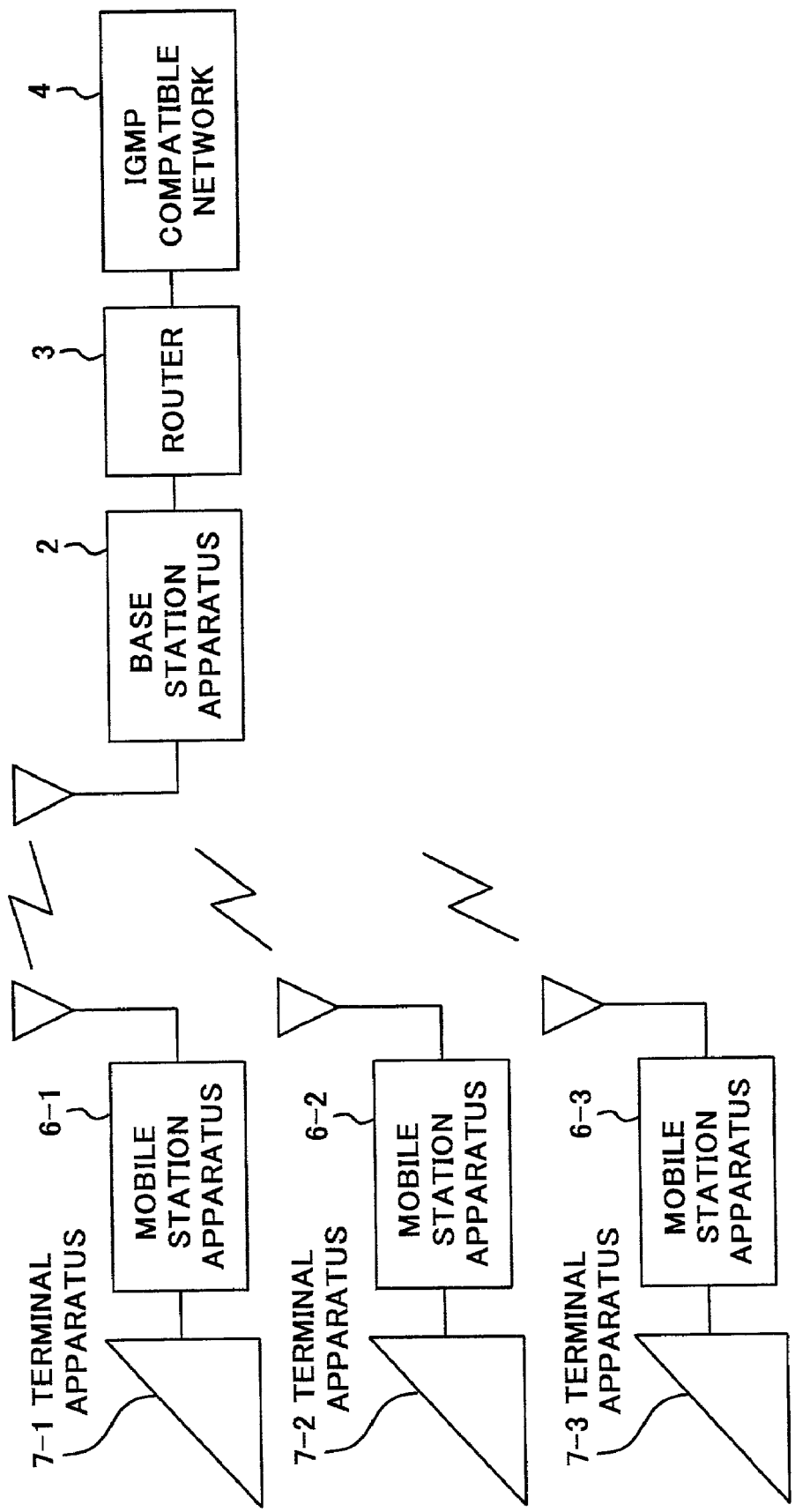
FIG. 1 is a block diagram showing the configuration of a conventional mobile communication system.
Figure 2:
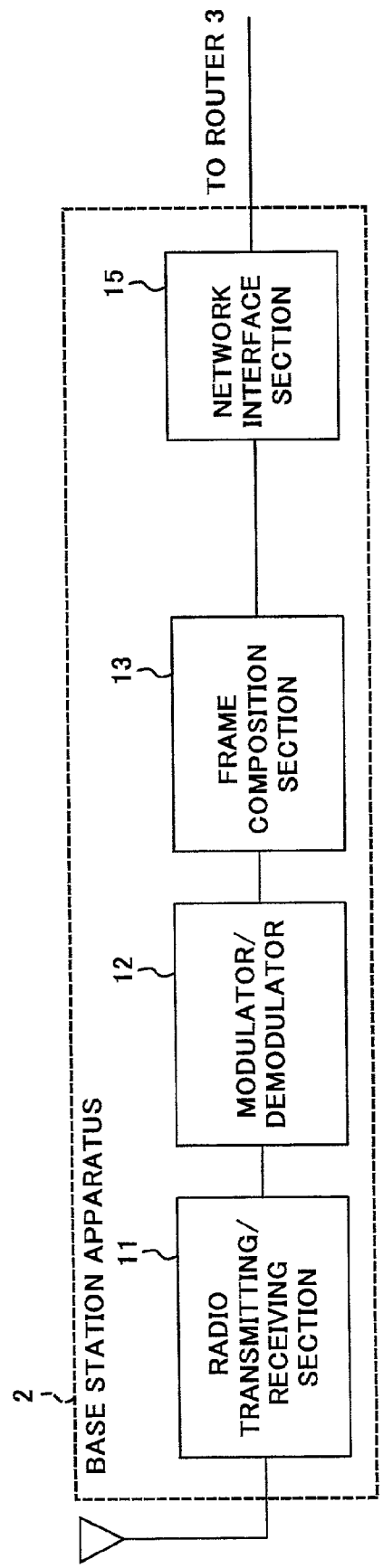
FIG. 2 is a block diagram showing the configuration of a base station apparatus in a conventional mobile communication system.
Figure 3:
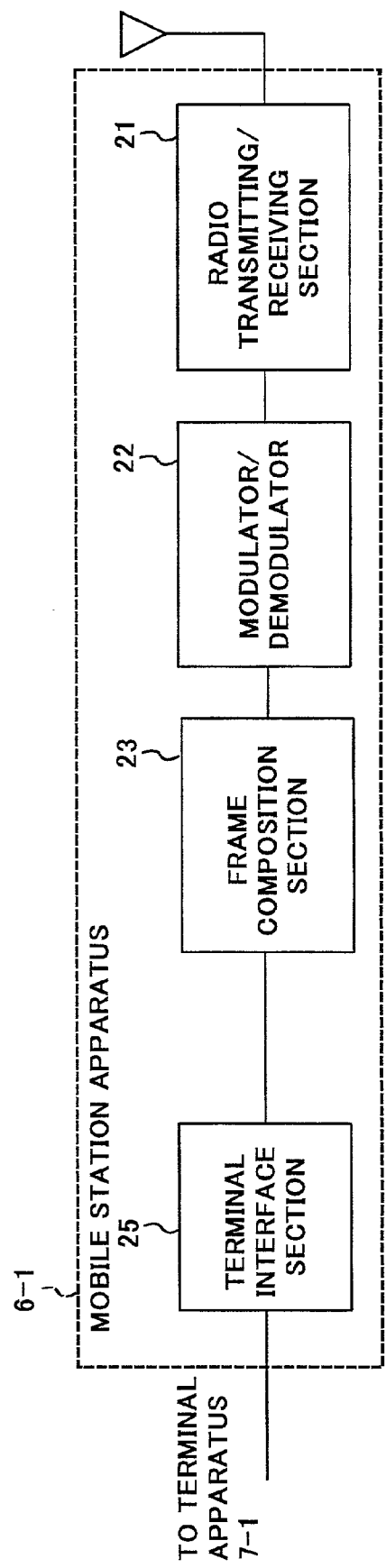
FIG. 3 is a block diagram showing the configuration of a mobile station apparatus in a conventional mobile communication system.
Figure 4:
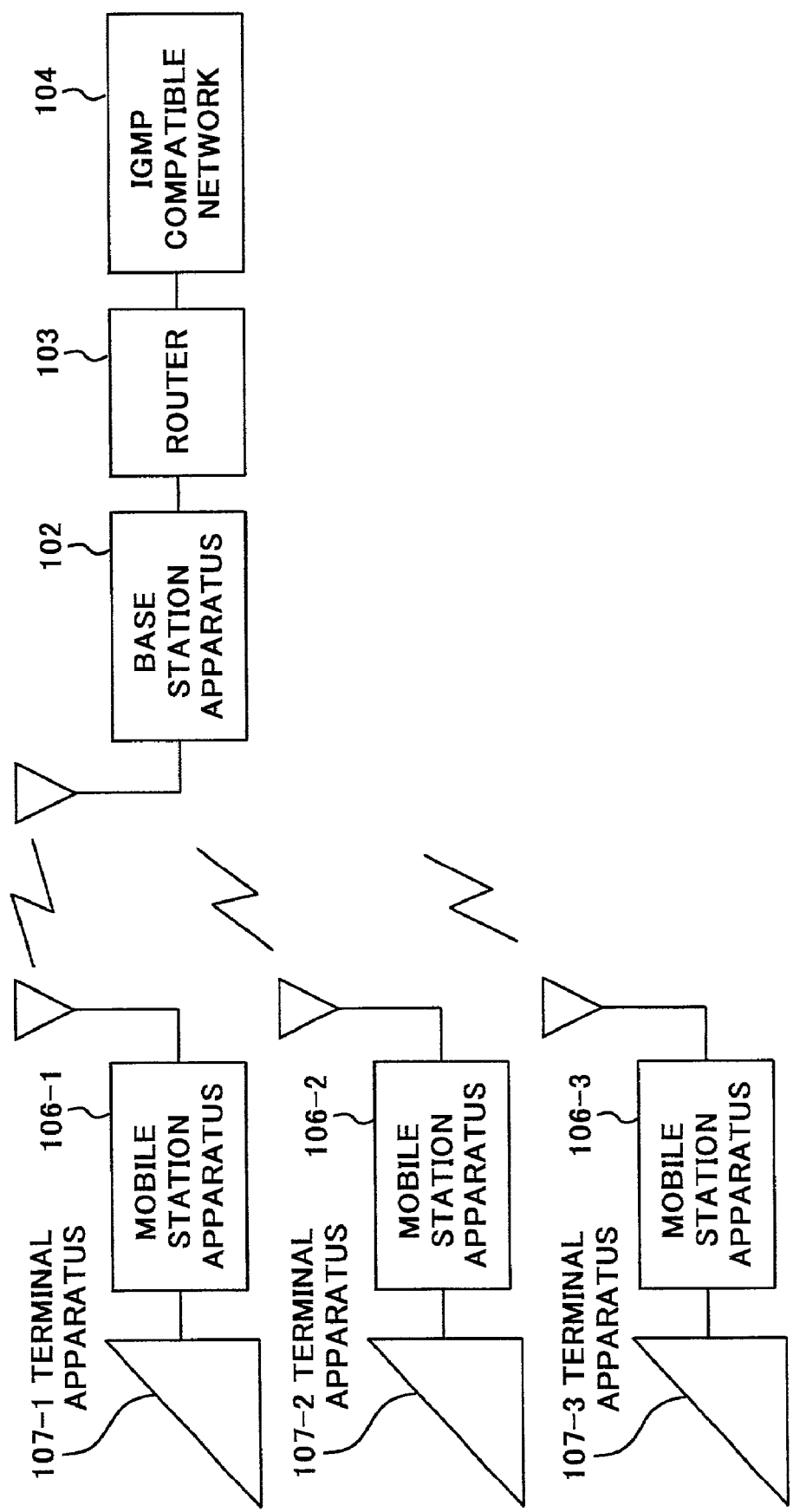
FIG. 4 is a block diagram showing the configuration of a mobile communication system according to an embodiment of the present invention.

FIG. 4 is a block diagram showing the configuration of a mobile communication system according to an embodiment of the present invention.

In FIG. 4, a router (IGMP compatible router) 103 is connected to a base station apparatus 102, and an IGMP compatible network 104 is connected to the router 103. A plurality of mobile station apparatuses 106-1 through 106-3 are arranged so as to be connected arbitrarily to terminal apparatuses, such as communication terminal apparatuses, 107-1 through 107-3 provided with computer functions.

Figure 5:
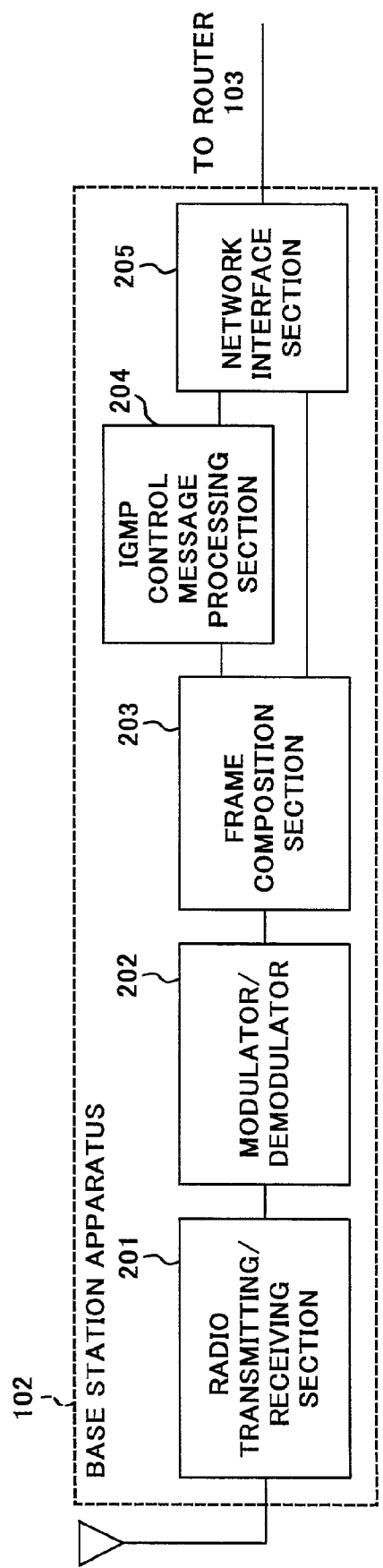
FIG. 5 is a block diagram showing the configuration of a base station apparatus in a mobile communication system according to the above embodiment.

As shown in FIG. 5, the base station apparatus 102 comprises a radio transmitting/receiving section 201, modulator/demodulator 202, frame composition section 203, IGMP control message processing section 204, and network interface section 205.

Figure 6:
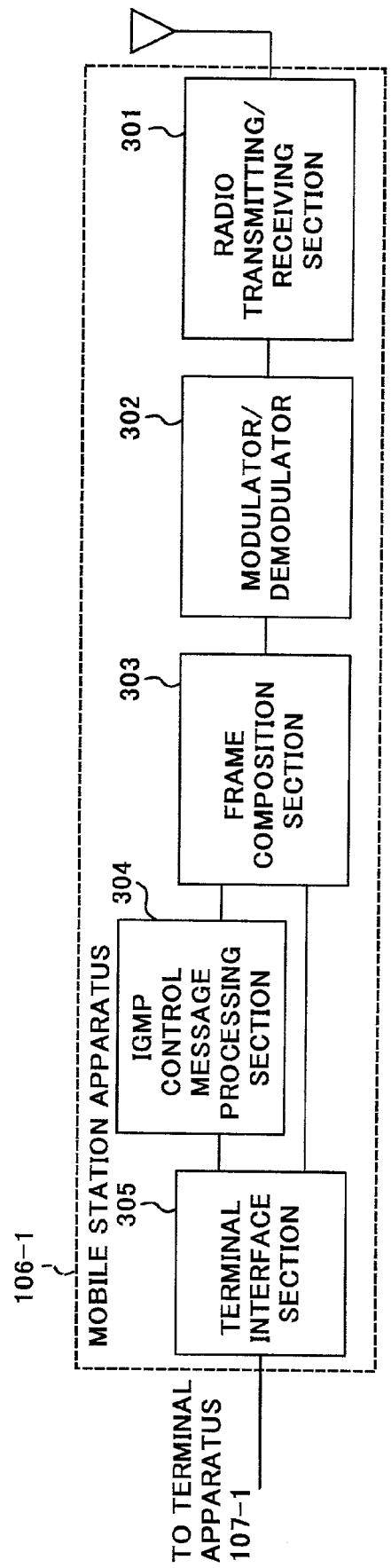
FIG. 6 is a block diagram showing the configuration of a mobile station apparatus in a mobile communication system according to the above embodiment.

As shown by the representative case of mobile station 106-1 in FIG. 6, each of mobile station apparatuses 106-1 through 106-3 comprises a radio transmitting/receiving section 301, modulator/demodulator 302, frame composition section 303, IGMP control message processing section 304, and terminal interface section 305.

With this kind of configuration, when an IGMP inquiry message arrives at the router 103 from the IGMP compatible network 104, the router 103 transmits an IP packet containing the IGMP inquiry message to subordinate base station apparatus 102.

In the base station apparatus 102, an IP packet transmitted from the router 103 is received by the network interface section 205, and is output to the frame composition section 203.

If the IP packet received by the network interface section 205 is an IP packet containing an IGMP inquiry message, it is output to the IGMP control message processing section 204.

In the IGMP control message processing section 204, the IGMP control message is extracted from the IP packet, and only the necessary part of this IGMP control message is mapped onto a fixed-length short packet (S-PDU) for controlling radio communication between the base station apparatus 102 and mobile station apparatuses 106-1 through 106-3. After this mapping has been carried out, the packet is output to the frame composition section 203.

The necessary part of the IGMP control message is the part remaining after removing at least the Check Sum field from the IGMP control message extracted from the IP packet. This will now be explained in more specific terms.

Normally, an IGMP control message is transferred stored in an IP packet. An IP packet is composed of a variable-length IP header of at least 32 octets and a variable-length message part of at least 4 octets. An IGMP control message is stored in the message part. The necessary part is the part remaining after removing the IP header from an IP packet.

An IGMP control message comprises 8 octets, and these constitute the necessary part. It is also possible to further reduce this part. An IGMP control message is composed of a 1-octet Type field, a 1-octet Max Response Time field, a 2-octet Check Sum field, and a 4-octet Group Address field, but when a control message in which the S-PDU is other than an IGMP is transferred, it is usual for an error detection code field such as a Check Sum or CRC field to be provided in common rather than on a message-specific basis. Consequently, it is possible to omit the Check Sum field in an IGMP control message. Moreover, it is also possible to omit the Max Response Time field if this has been fixed by executing negotiation processing via transmission/reception beforehand.

Next, in the frame composition section 203, a variable-length IP packet from the network interface section 205 is converted to a fixed-length packet (L-PDU), and a frame signal is composed from this L-PDU and an S-PDU from the IGMP control message processing section 204, and is output to the modulator/demodulator 202.

The frame signal is modulated by the modulator/demodulator 202, then undergoes various kinds of transmission processing such as D/A conversion, up-conversion, and amplification (gain control) in the radio transmitting/receiving section 201, and is transmitted as a radio signal from the antenna.

This transmit signal is received by the radio transmitting/receiving section 301 via the antenna of each of mobile station apparatuses 106-1 through 106-3. This received signal undergoes various kinds of reception processing such as amplification (gain control), down-conversion, and A/D conversion in the radio transmitting/receiving section 301.

After undergoing this processing, the signal is demodulated by the modulator/demodulator 302. This demodulated signal undergoes frame decomposition by the frame composition section 303 and conversion from a fixed-length packet (L-PDU) to a variable-length packet, and an IP packet is extracted.

Furthermore, a fixed-length short packet (S-PDU) is extracted in the frame composition section 303, and an IP packet containing an IGMP control message is composed in the IGMP control message processing section 304.

In the terminal interface section 305 that receives IP packets from the frame composition section 303 and IGMP control message processing section 304, these IP packets are multiplexed and then output to terminal apparatuses 107-1 through 107-3.

Here, in the case where terminal apparatuses 107-1 through 107-3 attempt to participate in a multicast group, when an IGMP inquiry message is received from mobile station apparatuses 106-1 through 106-3, an IGMP report message is sent via mobile station apparatuses 106-1 through 106-3 to the IP address of the multicast group in which participation is desired.

In mobile station apparatuses 106-1 through 106-3, an IP packet received from the respective terminal apparatus 107-1 through 107-3 is received by the terminal interface section 305 and output to the frame composition section 303.

If the IP packet received by the terminal interface section 305 is an IP packet containing an IGMP control message, it is output to the IGMP control message processing section 304.

In the IGMP control message processing section 304, the IGMP control message is extracted from the IP packet and after being stored in a fixed-length short packet (S-PDU), is output to the frame composition section 303.

In the frame composition section 303, the variable-length IP packet received from the terminal interface section 305 is converted to a fixed-length packet (L-PDU), a frame signal is composed from the L-PDU and the S-PDU from the IGMP control message processing section 304, and is output to the modulator/demodulator 302.

The frame signal is modulated by the modulator/demodulator 302, then undergoes various kinds of transmission processing such as D/A conversion, up-conversion, and amplification (gain control) in the radio transmitting/receiving section 301, and is transmitted as a radio signal from the antenna.

After being received by the antenna of the base station apparatus 102, this transmit signal undergoes various kinds of reception processing such as amplification (gain control), down-conversion, and A/D conversion in the radio transmitting/receiving section 201.

After undergoing this processing, the signal is demodulated by the modulator/demodulator 202, and undergoes frame decomposition by the frame composition section 203 and conversion from a fixed-length packet (L-PDU) to a variable-length packet, and an IP packet is extracted.

Furthermore, a fixed-length short packet (S-PDU) is extracted in the frame composition section 203, and an IP packet containing an IGMP control message is composed in the IGMP control message processing section 204.

If the S-PDU received by the IGMP control message processing section 204 contains IGMP report message content, an IP packet containing the IGMP report message is composed and output to the network interface section 205, and that received S-PDU is also transmitted to terminal apparatuses 107-1 through 107-3 participating in the multicast group indicated by the IGMP report message.

In the terminal interface section 205 that receives IP packets from the frame composition section 203 and IGMP control message processing section 204, these IP packets are multiplexed and then transmitted to the router 103.

Thus, according to a radio communication system of this embodiment, IGMP control message processing sections 204 and 304 map only the necessary part of a terminated IGMP control message onto a fixed-length short packet (S-PDU) between the base station apparatus 102 and mobile station apparatuses 106-1 through 106-3.

Consequently, information other than that actually required is not transmitted or received. That is to say, the IP header of an IP packet, which is not needed in a radio channel, is not transmitted or received, and therefore the previous redundancy of information is eliminated, making possible a proportional reduction in overhead and improvement in efficient use of frequency bands compared to heretofore.

In an IP packet, the IP header not required in a radio channel comprises at least 24 octets, and considering the fact that the number of octets may be in excess of 40 when an option header is used in addition to an IP header, the effect of the present invention is significant.

In the above-described embodiment, a mode has been described whereby a base station apparatus 102 performs radio communication with mobile station apparatuses 106-1 through 106-3, but the present invention is not limited to this, and can also be applied to a media sharing type access network comprising a fixed main station and a fixed plurality of substations, such as FTTH and ADSL.

A radio apparatus of the present invention has a configuration comprising a section that determines whether or not control procedure information for controlling packet communication is contained in a variable-length packet in which is indicated a destination for performing communication in a one-to-one or one-to-multiple mode with other radio apparatuses, and a section that, when the result of that determination is that such control procedure information is so contained, maps that control procedure information onto a fixed-length short packet that is shorter than a fixed-length packet used for communication with other radio apparatuses.

According to this configuration, only control procedure information is mapped onto a short packet that has a small amount of information, and therefore the previous redundancy of information is eliminated, making possible a proportional reduction in overhead and improvement in efficient use of frequency bands compared to heretofore.

A radio apparatus of the present invention has, in the above-described configuration, a configuration whereby only a necessary part of control procedure information is mapped onto a short packet. According to this configuration, only a necessary part of control procedure information is mapped onto a short packet that has a small amount of information, further enabling overhead to be reduced and frequency bands to be used efficiently.

A radio apparatus of the present invention has, in the above-described configuration, a configuration comprising a section that maps a variable-length packet onto a fixed-length packet, composes a frame signal from this fixed-length packet after mapping and a short packet onto which control procedure information has been mapped, and transmits that frame signal. According to this configuration, control procedure information can be transmitted on a communication channel.

A radio apparatus of the present invention has, in the above-described configuration, a configuration comprising a section that decomposes a frame signal and extracts a variable-length packet and short packet, a section that extracts control procedure information from that short packet and maps it onto another variable-length packet, and a section that multiplexes both those variable-length packets. According to this configuration, both control procedure information and user information can be multiplexed on the same channel.

A radio apparatus of the present invention has, in the above-described configuration, a configuration whereby control procedure information is IGMP (Internet Group Multicast Protocol) information. According to this configuration, the same kind of operational effect as any of the above can also be obtained in the case of IGMP information.

A radio apparatus of the present invention has, in the above-described configuration, a configuration whereby a variable-length packet is an IP (Internet Protocol) packet. According to this configuration, the same kind of operational effect as any of the above can also be obtained in the case of an IP packet.

A mobile station apparatus of the present invention has a configuration whereby a radio apparatus of the same configuration as any of the above is provided. According to this configuration, the same kind of operational effect as any of the above can be obtained in a mobile station apparatus.

A base station apparatus of the present invention has a configuration whereby a radio apparatus of the same configuration as any of the above is provided. According to this configuration, the same kind of operational effect as any of the above can be obtained in a base station apparatus.

A radio communication system of the present invention is provided with a mobile station apparatus and base station apparatus of the above configuration, and has a configuration whereby one station apparatus of the above-mentioned mobile station apparatus and above-mentioned base station apparatus performs radio resource assignment. According to this configuration, the radio resource assignment function is not held on a fixed basis by one radio station apparatus (for example, a base station apparatus), but instead the location of the radio resource assignment function can be changed on a pro tempore basis.

A radio communication system of the present invention has a configuration whereby a radio apparatus of the same configuration as any of the above and a communication network apparatus that transmits and receives variable-length packets via that radio apparatus and a router are provided. According to this configuration, the same kind of operational effect as any of the above can be obtained in a radio communication system.

In a multicast communication method of the present invention, when communication is performed in a one-to-one or one-to-multiple mode between radio apparatuses, in the case where control procedure information for controlling packet communication is contained in a variable-length packet in which a destination for performing that communication is indicated, a radio apparatus transmits that control procedure information after mapping it onto a fixed-length short packet shorter than a fixed-length packet used for communication with other radio apparatuses.

According to this method, only control procedure information is mapped onto a short packet that has a small amount of information, and therefore the previous redundancy of information is eliminated, making possible a proportional reduction in overhead and improvement in efficient use of frequency bands compared to heretofore.

In a multicast communication method of the present invention, in the above-described method, a variable-length packet is mapped onto a fixed-length packet, and a frame signal is composed from this fixed-length packet after mapping and a short packet onto which control procedure information has been mapped, and is transmitted. According to this method, control procedure information can be transmitted on a communication channel.

In a multicast communication method of the present invention, in the above-described method, a variable-length packet and short packet are extracted from a frame signal, control procedure information is extracted from this short packet and mapped onto another variable-length packet, after which both variable-length packets are multiplexed. According to this method, both control procedure information and user information can be multiplexed on the same channel.

As described above, according to the present invention radio communication resources can be used efficiently when multicast communication is performed using an IGMP.

This application is based on Japanese Patent Application No. 2000-189592 filed on Jun. 23, 2000, entire content of which is expressly incorporated by reference herein.

INDUSTRIAL APPLICABILITY

The present invention is applicable to a radio communication system and multicast communication system that perform multicast communication (one-to-multiple communication) using an IP between a base station apparatus and a plurality of mobile station apparatuses such as mobile phones in a digital mobile communication system.

The invention claimed is:

1. A radio apparatus that communicates using a fixed-length packet and a fixed-length short packet, which is shorter than the fixed-length packet, the radio apparatus comprising:
    an interface section that identities a first Internet Group Multicast Protocol (IGMP) message contained in a first Internet Protocol (IP) packet;
    an IGMP processing section that maps a subset of the identified first IGMP message into a first fixed-length short packet; and
    a frame composition section that maps a second IP packet into a first fixed-length packet and composes a first frame signal from the first fixed-length packet and the first fixed-length short packet.

2. The radio apparatus of claim 1, wherein the IGMP processing section removes a check sum field from the identified first IGMP message and maps the rest of the identified first IGMP message into the first fixed-length short packet.

3. The radio apparatus of claim 1, wherein:
    the frame composition section decomposes a second frame signal received from another radio apparatus to extract a third IP packet and a second fixed-length short packet from the received second frame signal; and
    the IGMP processing section extracts a second IGMP message from the extracted second fixed-length short packet and maps the extracted second IGMP message into a fourth IP packet.

4. The radio apparatus of claim 3, wherein the interface section multiplexes the third and fourth IP packets.

5. A base station apparatus comprising the radio apparatus of claim 1.

6. A mobile station apparatus comprising the radio apparatus of claim 1.

7. A radio communication system having a mobile or base station that controls radio resource allocation, the mobile or base station having a radio apparatus that communicates using a fixed-length packet and a fixed-length short packet, which is shorter than the fixed-length packet, the radio apparatus comprising:
    an interface section that identifies a first Internet Group Multicast Protocol (IGMP) message contained in a first Internet Protocol (IP) packet;
    an IGMP processing section that maps a subset of the identified first IGMP message into a first fixed-length short packet; and
    a frame composition section that maps a second IP packet into a first fixed-length packet and composes a first frame signal from the first fixed-length packet and the first fixed-length short packet.

8. The radio communication system of claim 7, wherein the IGMP processing section removes a check sum field from the identified first IGMP message and maps the rest of the identified first IGMP message into the first fixed-length short packet.

9. A radio communication system comprising:
    a communication network apparatus; and
    a radio apparatus that:
        a) communicates with using a fixed-length packet and a fixed-length short packet, which is shorter than the fixed-length packet, and
        b) communicates Internet Protocol (IP) packets with the communication network apparatus via a router, the radio apparatus comprising:
            an interface section that identifies an Internet Group Multicast Protocol (IGMP) message contained in an Internet Protocol (IP) packet received from the communication network apparatus; and an IGMP processing section that maps a subset of the identified IGMP message into a fixed-length short packet.

10. The radio communication system of claim 9, wherein the IGMP processing section removes a check sum field from the identified IGMP message and maps the rest of the identified IGMP message into the fixed-length short packet.

11. A multicast communication method for communicating between radio apparatuses a fixed-length packet and a fixed-length short packet, which is shorter than the fixed-length packet, the method comprising:

identifying a first Internet Group Multicast Protocol (IGMP) message contained in a first Internet Protocol (IP) packet;

mapping a subset of the identified first IGMP message into a first fixed-length short packet;

mapping a second IP packet into a first fixed-length packet; and composing a first frame signal from the first fixed-length packet and the first fixed-length short packet.

12. The method of claim 11, further comprising removing a check sum field from the identified first IGMP message before mapping the rest of the identified first IGMP message into the first fixed-length short packet.

13. The method of claim 11, further comprising:

decomposing a second frame signal received from another radio apparatus to extract a third IP packet and a second fixed-length short packet from the received second frame signal, extracting a second IGMP message from the extracted second fixed-length short packet, and mapping the extracted second IGMP message into a fourth IP packet.

* * * * *